United States Patent
Pg et al.

(10) Patent No.: US 7,584,302 B1
(45) Date of Patent: Sep. 1, 2009

(54) BUSINESS INTEGRATION COMPONENT FOR CONTAINERS

(75) Inventors: Binod Pg, Bangalore (IN); Manisha Umbarje, Short Hills, NJ (US)

(73) Assignee: Sun Microsystems, Inc., Santa Clara, CA (US)

( * ) Notice: Subject to any disclaimer, the term of this patent is extended or adjusted under 35 U.S.C. 154(b) by 487 days.

(21) Appl. No.: 11/471,395

(22) Filed: Jun. 19, 2006

(51) Int. Cl.
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl. .................. 709/246; 709/230; 719/313; 719/330

(58) Field of Classification Search .............. 709/230, 709/246; 719/313, 328–330
See application file for complete search history.

(56) References Cited

U.S. PATENT DOCUMENTS

| | | | |
|---|---|---|---|
| 2003/0105887 A1* | 6/2003 | Cox et al. ................. | 709/328 |
| 2006/0200515 A1* | 9/2006 | Cousins et al. ............ | 709/201 |
| 2007/0005801 A1* | 1/2007 | Kumar et al. ............. | 709/238 |
| 2007/0106769 A1* | 5/2007 | Liu ........................... | 709/223 |

* cited by examiner

*Primary Examiner*—George C Neurauter, Jr.
(74) *Attorney, Agent, or Firm*—Osha • Liang LLP

(57) ABSTRACT

A system for bidirectional communication using normalized messages via a service engine includes a Java Enterprise Edition (EE) package, a Java Business Integration (JBI) package including a Normalized Message Router (NMR) and a binding component, and the service engine for enabling direct communication between the Java EE package and the JBI package, where the service engine converts a first message from a first protocol to a second protocol, where the first message is sent from the Java EE package to the JBI package, and the service engine converts a second message from the second protocol to the first protocol, where the second message is sent from the JBI package to the Java EE package.

17 Claims, 5 Drawing Sheets

BUSINESS INTEGRATION COMPONENT FOR CONTAINERS

BACKGROUND

The Java™ technology is both a programming language and a platform, initially developed by Sun Microsystems, Inc. On one hand, the Java™ programming language is a high-level, object-oriented language and to a certain extent, similar to the C++ programming language. Java™ source code is written in plain text based on specific syntax and stored in files ending with the ".java" extension. The source code is then complied by the Java™ complier, javac, into a type of machine language called "bytecode" and stored in files ending with the ".class" extension. However, bytecode is not code that is native to a particular type of processor. Instead, to execute a complied Java™ program, the bytecode is interpreted by the Java™ interpreter, java, within the Java™ runtime environment, known as the "Java™ Virtual Machine" (JVM).

On the other hand, the Java™ platform is the software environment in which a Java™ program runs. It contains two components: the JVM and the "Java™ Application Programming Interface" (JAPI). The JAPI is a large collection of ready-made software components that provides many useful functions or capabilities. It is grouped into libraries of related classes and interfaces, known as "packages." Some of the common JAPI include Java™ Enterprise Edition (EE), Java™ Standard Edition (SE), and Java™ Micro Edition (ME).

Java™ EE is package containing a set of coordinated technologies and practices that enable solutions for developing, deploying, and managing multi-tier, server-centric applications. Some of the Java™ EE technologies are: web services technologies, component model technologies, management technologies, transaction technologies, etc. Specifically, Java™ EE contains web application servers that provide containers to deploy enterprise applications including web services. Java™ SE provides a complete environment for application development on desktops and servers and for deployment in embedded environments. It provides the basis for security, database connectivity, etc.

The core Java™ platforms also contain an "extension mechanism" that enables the JVM to use Java™ classes contained in optional packages (formerly known as "standard extensions") that are not part of the core platforms in much the same way as the JVM uses the classes contained in the core platforms. Thus, software developers may extend the functionality of the core platforms by developing their own Java™ packages and attaching these optional packages to the core platforms.

Many such optional packages exist—one of which is the "Java™ Business Integration" (JBI) package. JBI extends Java™ EE and Java™ SE and enables the creation of a Java™ business integration environment for specifications, such as Web Service Choreography Interface (WSCI), Business Process Execution Language for Web Services (BPEL4WS), and the World Wide Web Consortium (W3C) Choreography Working Group. As part of JBI, a new layer of standard metadata in the web services stack is being formed to help define standards for business integration. For example, the term "business protocol" is the metadata used to describe the interaction between a set of business processes that implement the roles of partners within a larger service composition. The term "abstract business process" is the metadata that describes how a business process, within a business protocol, choreographs its role in a service composition so that its partner processes understand how to interact with it. JBI employs this concept and defines its own set of abstract business process metadata using open-ended components. Thus, fundamentally, JBI includes a container and various plug-in components, whereas the container hosts the plug-in components and the plug-in components communicate via message routers.

JBI has a service-oriented architecture and treats its components as service providers and consumers. JBI divides the task of supporting these components into three roles: the JBI Environment, the JBI Machine, and the JBI Binding. The Environment defines a standard internal representation for business protocol messages based on standard business protocol metadata. Each JBI Machine is responsible for supporting the lifecycle of a particular class of JBI Components. Each JBI Binding is used by the Environment to communicate with external services via specific business protocol bindings. Thus, many disparate protocols, bindings, and message formats exist, which are capable of being exchanged. No standard communication mechanism exists between JBI service providers/consumers and the Java™ EE technologies, so implementers currently manage these differences individually on a case-by-case basis.

SUMMARY

In general, in one aspect, the invention relates to a system for bidirectional communication using normalized messages via a service engine, comprising a Java Enterprise Edition (EE) package, a Java Business Integration (JBI) package comprising a Normalized Message Router (NMR) and a binding component, and the service engine for enabling direct communication between the Java EE package and the JBI package, wherein the service engine converts a first message from a first protocol to a second protocol, wherein the first message is sent from the Java EE package to the JBI package, and the service engine converts a second message from the second protocol to the first protocol, wherein the second message is sent from the JBI package to the Java EE package.

In general, in one aspect, the invention relates to a method of bidirectional communication using normalized messages via a service engine, comprising initiating a first message in a first protocol from a plurality of protocols, converting the first message from the first protocol to a second message in a second protocol from the plurality of protocols, and forwarding the second message to a destination of the first message.

In general, in one aspect, the invention relates to a computer readable medium comprising software instructions for bidirectional communication using normalized messages via a service engine, comprising initiating a first message in a first protocol from a plurality of protocols, converting the first message from the first protocol to a second message in a second protocol from the plurality of protocols, and forwarding the second message to a destination of the first message.

Other aspects of the invention will be apparent from the following description and the appended claims.

DETAILED DESCRIPTION

Figure 1:
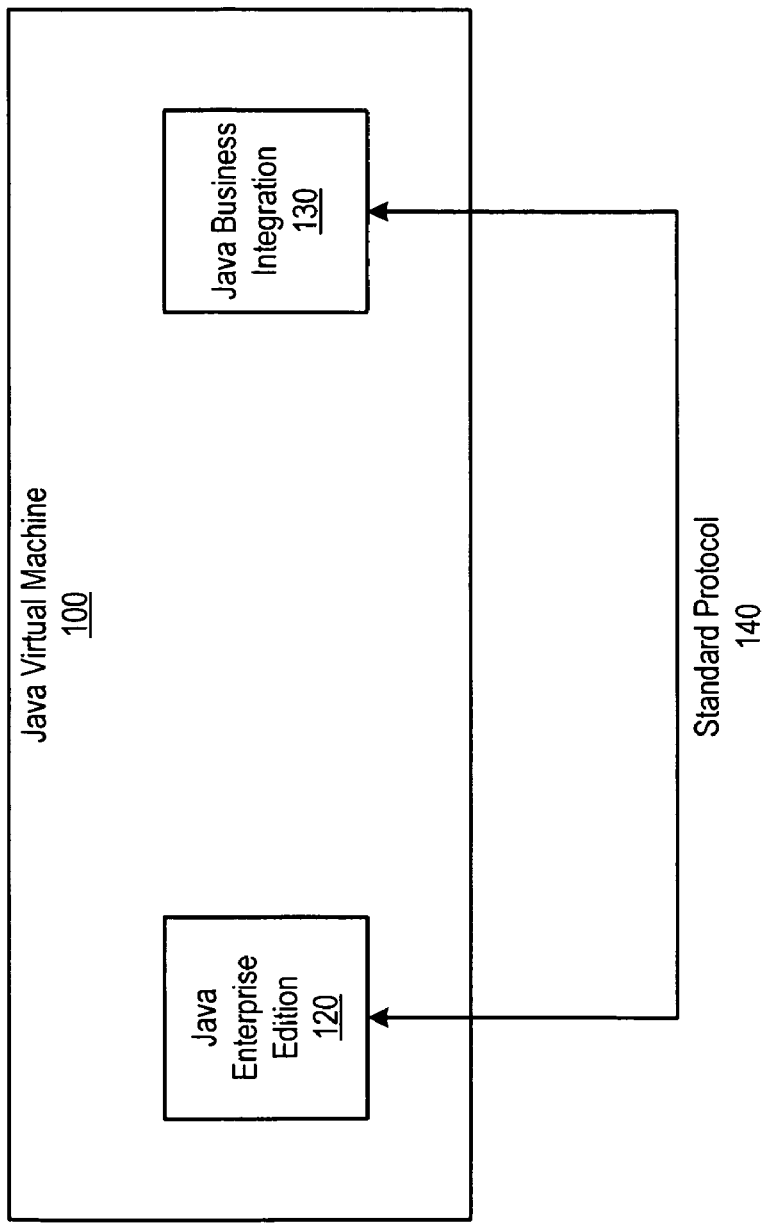
FIG. 1 shows a system that contains Java™ Enterprise Edition and Java™ Business Integration.

Exemplary embodiments of the invention will be described with reference to the accompanying figures. Like elements in the figures are denoted by like reference numerals for consistency.

In the exemplary embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a system and method for bidirectional communication between JBI and Java™ EE to manage disparate protocols, bindings, and messages using normalized messages via a JBI-based service engine. More specifically, the service engine acts as a bridge between Java™ EE application servers and JBI, so that Java™ EE and JBI may communicate within the same Java™ Virtual Machine (JVM). The service engine supports both service consumers and providers. The normalized messages may be of any binding. One skilled in the art will appreciate that while JBI, Java™ EE, and JVM are terms used throughout this description, one or more embodiments of this invention should not be limited to only an implementation involving Java™ technology. JBI, Java™ EE, and JVM, as used herein, should be treated as covering any packages with similar functionality as JBI or Java™ EE or virtual machines that have similar functionality as JVM.

FIG. 1 shows a system that contains Java™ EE and JBI. This figure represents a typical architectural setup for Java™ EE and JBI to function together. As shown in FIG. 1, within a JVM (100), there is a Java™ EE (120) package and a JBI (130) package. As described above, the JBI (130) is an optional package that extends Java™ EE (120) package with business integration programming interface. However, while the Java™ EE (120) application servers provide containers to deploy enterprise applications, applications hosted in Java™ EE (120) application servers cannot access services exposed by service providers in JBI (130). At the same time, services exposed by service consumers in JBI (130) cannot access applications hosted in Java™ EE (120) application servers. In other words, there is no direct communication between Java™ EE (120) and JBI (130) despite being in the same JVM (100). As a result, Java™ EE (120) and JBI (130) must communicate with each other using a standard protocol, such as HyperText Transfer Protocol (HTTP) (140), outside of the JVM (100).

Figure 2:
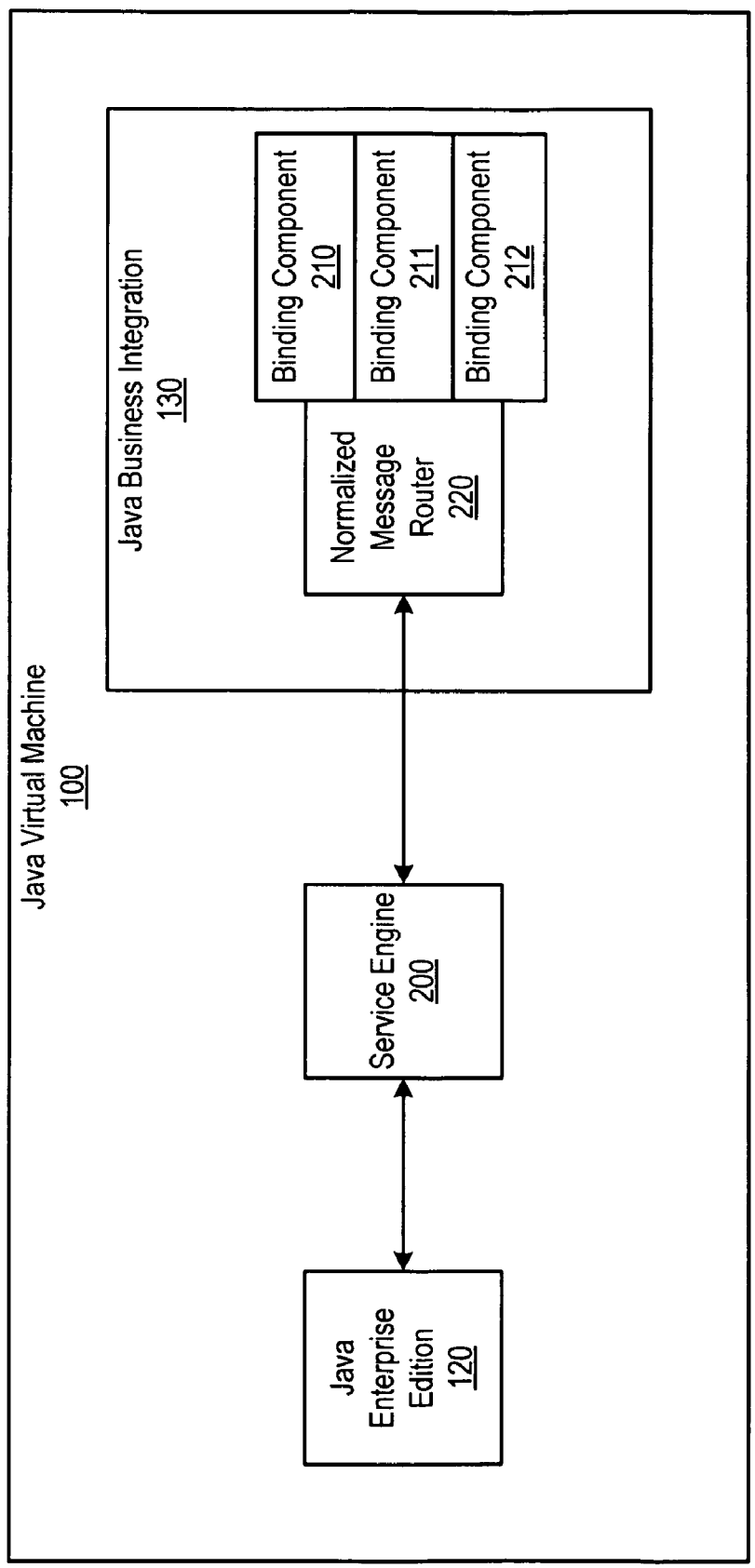
FIG. 2 shows a system in accordance with one or more embodiments of the invention.

FIG. 2 shows a system in accordance with one or more embodiments of the invention. Specifically, FIG. 2 shows a JVM (100) in accordance with one or more embodiments of the invention. In one or more embodiments of the invention, a service engine (200) acts as a communication bridge between Java™ EE (120) and JBI (130), which enables Java™ EE (120) and JBI (130) to communicate with each other directly within the JVM (100).

In FIG. 2, the service engine (200) is represented as an independent plug-in component; however, one skilled in the art will appreciate that in other embodiments of the invention, the service engine (200) may be a component of either the Java™ EE (120) or the JBI (130). As described above, the JBI (130) (or, depending on implementation, the JVM (100)) typically includes a collection of components that provide various types of business integration services. These services reside in containers called "service engines components." These service engine components implement business logic and other related services.

In addition, external services—that is, services residing outside the JBI (130) environment—may connect to the JBI (130) via different types of binding components (210, 211, 212), such as Simple Object Access Protocol (SOAP) binding or Java™ Message Service (JMS) binding. Binding components (210, 211, 212) provide transport level bindings for the deployed services. FIG. 2 shows only three binding components (210, 211, 212) to illustrate the concept; however, one skilled in the art will appreciate that there is no limit on how many binding components may be contained in the JBI (130).

In one or more embodiments of the invention, services, whether residing within or outside the JBI (130) environment, communicate with each other via the Normalized Message Router (NMR) (220). The NMR (220) mediates message exchanges between service consumers and providers. At a minimum, implementations of JBI (130) are required to support message-exchange sequences, such as those based on Web Services Description Language (WSDL) message-exchange patterns. In one or more embodiments of the invention, messages exchanged through the NMR (220) are normalized messages, which are composed of message properties, message payload, and message attachments.

In one or more embodiments of the invention, the service engine (200) uses the NMR (220) and binding components (210, 211, 212) contained in the JBI (130) to establish direct communication between the Java™ EE (120) and the JBI (130). Messages between Java™ EE (120) and JBI (130) go through the service engine (200) and are converted to normalized messages. For example, if the original message is SOAP, then the service engine (200) converts the message into normalized message using the SOAP binding component. Similarly, if the original message is JMS, then the service engine (200) converts the message into normalized message using the JMS binding component. Thus, the service engine (200) is able to convert any type of message as long as a binding component (210, 211, 212) supporting that type of communication protocol exists in JBI (130). By converting the messages of different protocols into normalized messages, the service engine (200) effectively bypasses the HTTP layer. Conversely, in one or more embodiments of the invention, the service engine (200) is also able to convert a normalized message into messages of different protocols.

Figure 3:
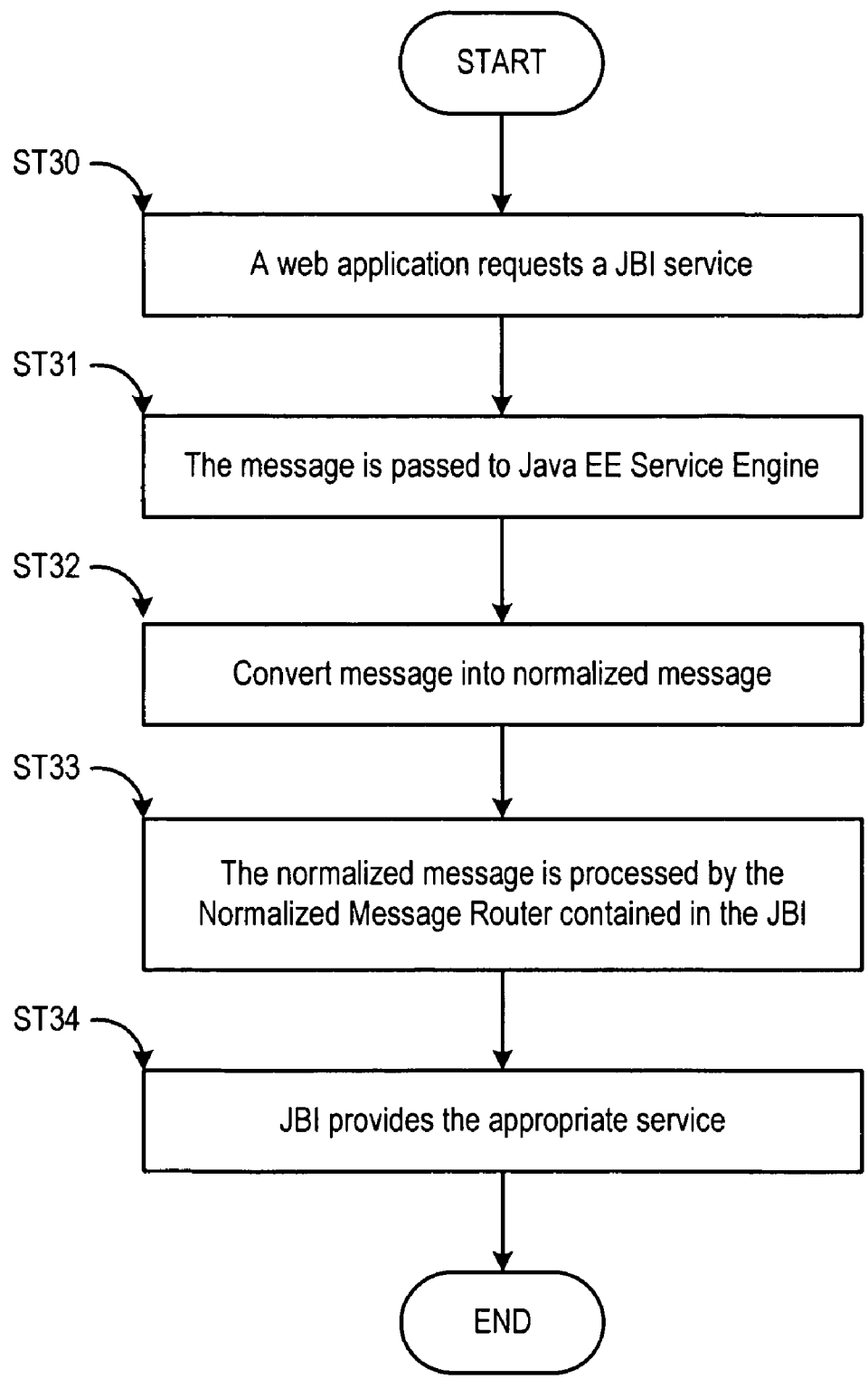
FIGS. 3-4 show high-level flowcharts in accordance with one or more embodiments of the invention.

FIG. 3 shows a flowchart in accordance with one or more embodiments of the invention. This flowchart focuses on Java™ EE sending a message to JBI. In one or more embodiments of the invention, a web application deployed in Java™ EE needs a particular service provided by JBI. The web application sends a request for the JBI service (ST30). In one or more embodiments of the invention, the request is sent to the Java™ EE. Because Java™ EE is aware that the service requested by the web application is a JBI component, Java™ EE passes a message containing all the necessary information relating to the service request to JBI (ST31).

In one or more embodiments of the invention, the message first goes through a JBI-based service engine, whereas the service engine converts the message into normalized message using an appropriate binding component contained in the JBI (ST32). The normalized message is then processed by the NMR contained in JBI (ST33). Thereafter, JBI provides the appropriate service requested by the web application (ST34).

Figure 4:
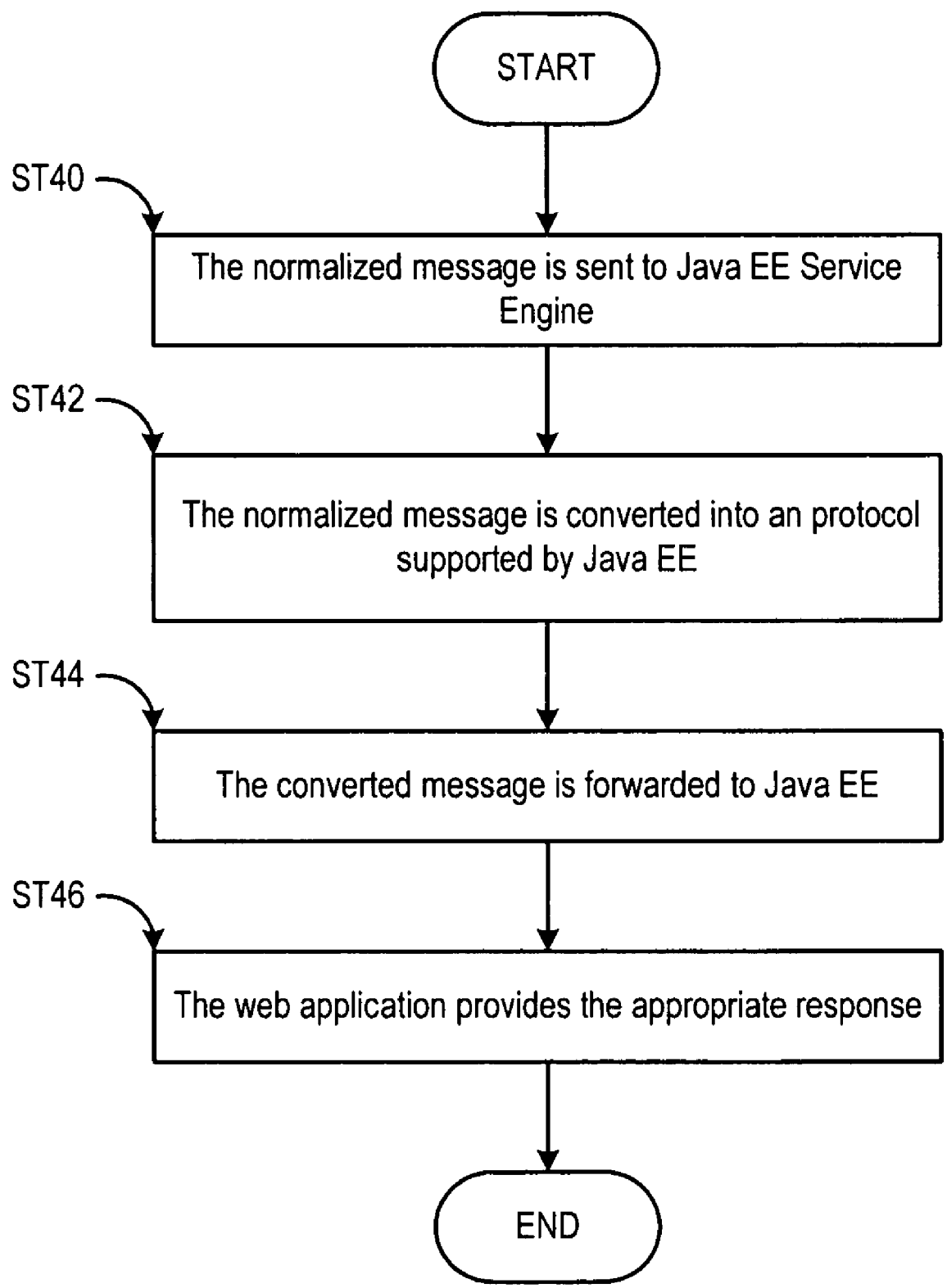

FIG. 4 shows a flowchart in accordance with one or more embodiments of the invention. This flowchart focuses on the JBI sending a message to Java™ EE. In one or more embodiments of the invention, a service consumer component in JBI needs access to a web application deployed in Java™ EE. Initially, a normalized message is sent to Java™ EE (ST40). In one or more embodiments of the invention, the message is sent from the service consumer component, through the JBI. The message first goes through a JBI-based service engine, where the normalized message is converted into a communication protocol supported by Java™ EE (ST42). In one or more embodiments of the invention, the service engine performs the conversion of the normalized message. For example, the service engine may convert the normalized message into a SOAP message. The converted message contains all the relevant information or data in the original normalized message. The converted message is then forwarded to the web application through Java™ EE (ST44). Thereafter, the web application provides the appropriate response (ST46).

The JBI-based service engine enables direct bidirectional communication between Java™ EE and JBI. Since both Java™ and JBI are within the same JVM, the JBI-based service engine takes advantage of the fact that JBI already contains a NMR and various types of binding components. By converting messages into normalized messages, Java™ EE and JBI are able to communicate directly, without using the HTTP outside of the JVM. Therefore, the instant invention increases communication performance between Java™ EE and JBI.

Figure 5:
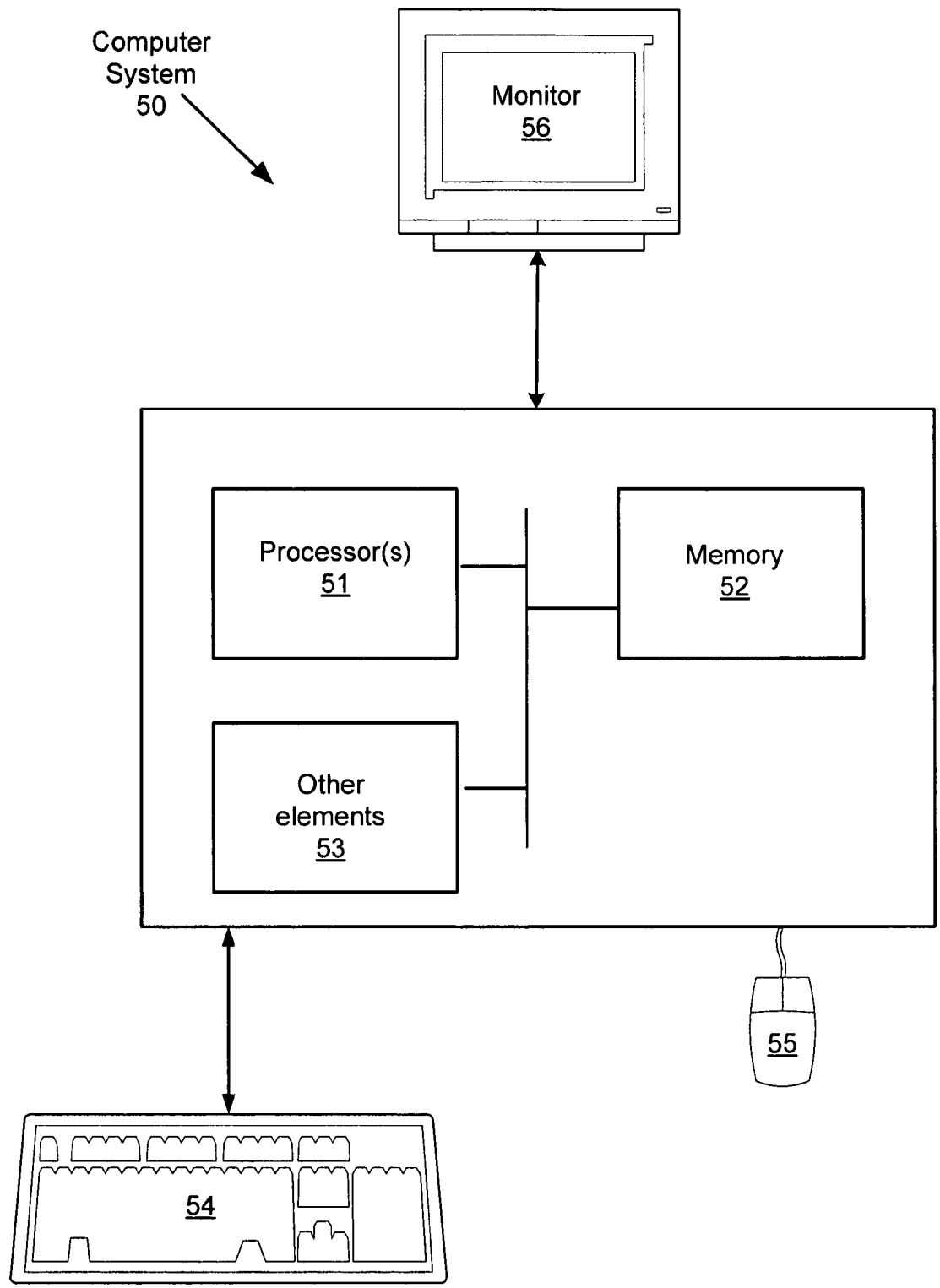
FIG. 5 shows a computer system in accordance with one or more embodiments of the invention.

One or more embodiments of the invention may be implemented on virtually any type of computer system regardless of the platform being used. For example, as shown in FIG. 5, a computer system (50) includes a processor (51), associated memory (52), and numerous other elements (53) and functionalities typical of today's computers, such as a storage device (not shown). The networked computer may also include input means, such as a keyboard (54) and a mouse (55), and output means, such as a monitor (56) or other display device. One skilled in the art will appreciate that the networked computer system may connect to a local area network (LAN) or a wide area network via a network interface connection (not shown). Those skilled in the art will also appreciate that these input and output means may take other forms.

Further, those skilled in the art will appreciate that one or more elements of the aforementioned computer system (50) may be located at a remote location and connected to the other elements over a network. Further, the invention may be implemented on a distributed system having a plurality of nodes, where each portion of the invention (e.g., JVM, JBI, NMR, Service Engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A system for bidirectional communication using normalized messages via a service engine, comprising:
    at least one storage device configured to store:
        a Java Enterprise Edition (EE) package; and
        a Java Business Integration (JBI) package comprising a Normalized Message Router (NMR) and a binding component; and
    a processor configured to execute the service engine for enabling direct communication between the Java EE package and the JBI package, wherein
        the service engine converts a first message in a first protocol to a second protocol, wherein the first message is sent from the Java EE package to the JBI package, and
        the service engine converts a second message in the second protocol to the first protocol, wherein the second message is sent from the JBI package to the Java EE package,
    wherein the Java EE package and the JBI package are within a same Java Virtual Machine (JVM).

2. The system of claim 1, wherein the Java EE package comprises a web application server.

3. The system of claim 2, wherein the first message originates from a web application deployed within the web application server.

4. The system of claim 3, wherein the first message requests a service from the JBI.

5. The system of claim 1, wherein the second protocol is a normalized message.

6. The system of claim 1, wherein the JBI package comprises a service provider and a service consumer.

7. The system of claim 6, wherein the second message originates from the service consumer.

8. A method of bidirectional communication using normalized messages via a service engine, comprising:
    initiating a first message in a first protocol of a plurality of protocols, wherein the first message originates from a Java Enterprise Edition (EE) package;
    converting the first message in the first protocol to a second message in a second protocol of the plurality of protocols; and
    forwarding the second message to a destination of the first message, wherein the destination is a Java Business Integration (JBI) package,
    wherein the Java EE package and the JBI package are within a same Java Virtual Machine (JVM).

9. The method of claim 8, wherein the second message comprises data contained in the first message.

10. The method of claim 8, further comprising:
    initiating a third message in the second protocol, wherein the third message originates from the JBI package;
    converting the third message from the second protocol to a fourth message in the first protocol; and
    forwarding the fourth message to the Java EE package.

11. The method of claim 10, wherein the JBI package comprises a Normalized Message Router (NMR) and a binding component.

12. The method of claim 10, wherein the first protocol is Simple Object Access Protocol (SOAP) and the second protocol is a normalized message.

13. The method of claim 8, wherein the first protocol is a normalized message and the second protocol is SOAP.

14. A computer readable medium comprising software instructions for bidirectional communication using normalized messages via a service engine, the software instructions comprising functionality for:
    initiating a first message in a first protocol of a plurality of protocols, wherein the first message originates from a Java Enterprise Edition (EE) package;

converting the first message in the first protocol to a second message in a second protocol of the plurality of protocols; and forwarding the second message to a destination of the first message, wherein the destination is a Java Business Integration (JBI) package, wherein the Java EE package and the JBI package are within a same Java Virtual Machine (JVM).

15. The computer readable medium of claim 14, wherein the second message comprises data contained in the first message.

16. The computer readable medium of claim 14, the software instructions further comprising functionality for:

initiating a third message in the second protocol, wherein the third message originates from the JBI package;

converting the third message in the second protocol to a fourth message in the first protocol; and forwarding the fourth message to the Java EE package.

17. The computer readable medium of claim 16, wherein the JBI package comprises a Normalized Message Router (NMR) and a binding component.

\* \* \* \* \*

UNITED STATES PATENT AND TRADEMARK OFFICE
CERTIFICATE OF CORRECTION

PATENT NO.         : 7,584,302 B1                          Page 1 of 1
APPLICATION NO. : 11/471395
DATED              : September 1, 2009
INVENTOR(S)        : Pg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this

Fourteenth Day of September, 2010

David J. Kappos
*Director of the United States Patent and Trademark Office*